US010865327B2

(12) United States Patent
Treadway

(10) Patent No.: US 10,865,327 B2
(45) Date of Patent: Dec. 15, 2020

(54) TINTABLE ABRASION RESISTANT COMPOSITIONS

(71) Applicant: Polymer Technology, Inc., Penngrove, CA (US)

(72) Inventor: Gerald Treadway, Penngrove, CA (US)

(*) Notice: Subject to any disclaimer, the term of this patent is extended or adjusted under 35 U.S.C. 154(b) by 0 days.

(21) Appl. No.: 16/293,007

(22) Filed: Mar. 5, 2019

(65) Prior Publication Data
US 2020/0002570 A1  Jan. 2, 2020

Related U.S. Application Data

(60) Provisional application No. 62/744,871, filed on Oct. 12, 2018, provisional application No. 62/691,949, filed on Jun. 29, 2018.

(51) Int. Cl.
| | | |
|---|---|---|
| C09D 183/10 | (2006.01) | |
| C09D 5/00 | (2006.01) | |
| C08G 77/442 | (2006.01) | |
| B05D 3/06 | (2006.01) | |

(52) U.S. Cl.
CPC ........... C09D 183/10 (2013.01); B05D 3/067 (2013.01); C08G 77/442 (2013.01); C09D 5/00 (2013.01); *B05D 2201/02* (2013.01); *B05D 2518/10* (2013.01); *C08G 2150/00* (2013.01)

(58) Field of Classification Search
CPC ...... C09D 183/10; C09D 5/00; C08G 77/442; C08G 2150/00; B05D 3/067; B05D 2201/02; B05D 2518/10
See application file for complete search history.

(56) References Cited

U.S. PATENT DOCUMENTS

| | | |
|---|---|---|
| 4,058,401 A | 11/1977 | Crivello |
| 4,079,160 A | 3/1978 | Philipson |
| 4,378,250 A | 3/1983 | Treadway et al. |
| 4,399,192 A | 8/1983 | Russell |
| 4,882,201 A | 11/1989 | Crivello et al. |
| 5,877,254 A | 3/1999 | La Casse et al. |
| 6,100,313 A | 8/2000 | Treadway |
| 6,780,232 B2 | 8/2004 | Treadway |
| 7,037,585 B2 | 5/2006 | Treadway |
| 7,285,603 B2 | 10/2007 | Vu |

(Continued)

OTHER PUBLICATIONS

International Search Report and Written Opinion of the ISA/US dated May 15, 2019 in International Application No. PCT/US2019/020736; 9pgs.

(Continued)

*Primary Examiner* — Robert S Walters, Jr.
(74) *Attorney, Agent, or Firm* — Haukaas Fortius PLLC; Michael H. Haukaas

(57) ABSTRACT

A coating composition with a stable shelf-life for forming a transparent coating upon eyeglass lenses or other substrates having improved abrasion resistance and tintability. The composition comprising a silicone-based binder component, a curing agent component, and being substantially free of volatiles. The binder component comprises the partial hydrolysis product of an epoxy-functional alkoxysilane, a polyglycidylether, and an acrylic monomer. The curing agent component comprises a cationic photoinitiator and a free radical photoinitiator.

21 Claims, 1 Drawing Sheet

(56) References Cited

U.S. PATENT DOCUMENTS

| | | | |
|---|---|---|---|
| 7,732,006 B2 | 6/2010 | Alberto de Rojas | |
| 2006/0148952 A1 | 7/2006 | Diggins | |
| 2006/0246305 A1 | 11/2006 | Cheng et al. | |
| 2008/0047468 A1 | 2/2008 | de Rojas | |
| 2014/0057115 A1* | 2/2014 | Treadway | C09D 171/00 428/412 |
| 2014/0342100 A1 | 11/2014 | Valeri | |
| 2016/0272841 A1* | 9/2016 | Litman | G02B 1/00 |
| 2017/0324040 A1 | 11/2017 | Yamamoto et al. | |

OTHER PUBLICATIONS

Sangermano et al., "New Horizons in Cationic Photopolymerization," Polymers, 10(2):136, Jan. 2018.

Silquest* A-187, Product Description, Momentive Performance Materials Inc., Jan. 2014.

American Ultraviolet, Inc. "The CASE for Extreme Intensity in UV Curing," American Ultraviolet Technical Library, accessed on the internet at https://www.americanultraviolet.com/uv-germicidal-solutions/documents-germicidal.cfml, retrieved Apr. 14, 2020.

Dao et al., "The Effect of UV Intensity on the Cure Profiles of Developing Networks," Radtech Report, pp. 16-19, Jul./Aug. 2009.

* cited by examiner

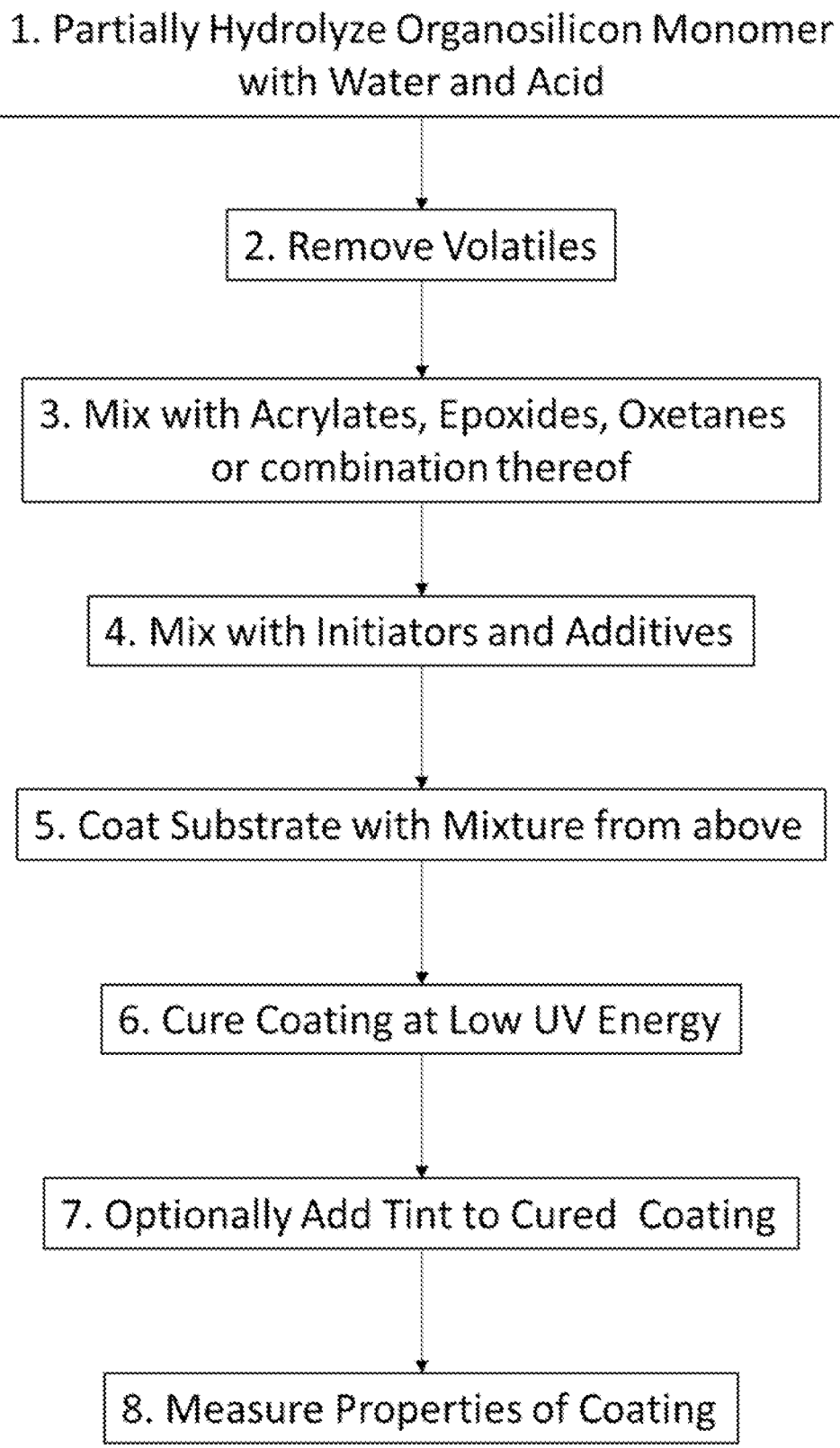

TINTABLE ABRASION RESISTANT COMPOSITIONS

RELATED APPLICATIONS

This application claims priority under 35 U.S.C. § 119(e) to U.S. Provisional Patent Application Nos. 62/744,871, filed Oct. 12, 2018 and 62/691,949, filed Jun. 29, 2018, which applications are incorporated herein by reference.

BACKGROUND OF THE INVENTION

Transparent plastic materials such as eyeglass lenses, television screen face plates and the protective coatings on photographic prints can be made of soft materials that are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly(methylmethacrylate), and these also can be scratched or abraded.

There are two main types of solvent free UV cure optical coatings. Tintable and non tintable coatings. The tintable coatings will tint to about 20% transmission in 15 mins but are less abrasion resistant than non tintable coatings. This results in coating labs needing two different coatings depending on their intended use. The more abrasion resistant non tintable coatings are preferred if tinting is not needed. However, for example, a tinted lens is often desired over a non-tinted lens.

The most common of these coatings use various proportions of a hydrolyzed epoxysilane in combination with acrylic monomers, and various ethers to enhance tintability as in U.S. Pat. No. 6,100,313 (Treadway), or other tintability enhancing compounds as disclosed in U.S. Pat. No. 7,732,006 (de Rojas). However, such tintability enhancing compounds disclosed in the '006 patent lead to lower abrasion resistance.

The '313 patent discloses a composition wherein an epoxy silane is treated with sufficient water to hydrolyze greater than 50% of the alkoxy groups on silicon, in combination with acrylic monomers and catatonically curable compounds such as non-silicon containing glycidyl ethers, and vinyl ethers. The '006 patent discloses a composition wherein an epoxy silane is treated with sufficient water to hydrolyze more than 30% of the alkoxy groups on silicon but specifically excludes any glycidyl or vinyl ethers.

One example given in '006 uses enough water to hydrolyze 49.9% of the alkoxy group of the epoxy silane in the composition that also includes tintability enhancing compounds. However, the '006 example results in a coating having lower abrasion resistance than the coatings from cationically curable compositions disclosed in '313.

Accordingly, it would be desirable to provide a coating composition that is capable of forming coatings having both excellent abrasion resistance and dye acceptance (i.e., tintability).

SUMMARY

This disclosure provides a composition wherein the degree of hydrolysis of an epoxy silane can unexpectedly produce coatings that cure with less UV energy. The cured coatings described herein provide excellent tintability and improved abrasion resistance as compared to existing UV-cured/tintable coatings. Furthermore, the disclosed compositions herein also have improved storage stability. Other benefits arise from curing at lower energy. Less energy from the UV source reduces warping of heat sensitive substrates, such as the plastic ophthalmic lenses MR8 and MR10 from Mitsui Chemicals. Also, less energy helps increase manufacturing throughput.

Accordingly, this disclosure provides a copolymer coating comprising monomer units from a) one or more (glycidyloxyalkyl)trialkoxysilanes; b) one or more acrylates; and c) one or more ethers, wherein the one or more ethers is a glycidyl ether, oxetanyl ether, vinyl ether, or a combination thereof; wherein the monomer units a)-c) or a)-b) form a cured copolymer coating and about 25% to about 49% of the alkoxy groups of the trialkoxysilane moieties of the copolymer coating have been hydrolyzed to form silanols.

Also, this disclosure provides a copolymer coating wherein the monomer units a)-c) or a)-b) form the cured copolymer coating at a cure energy of about 0.1 mJ to about 0.8 mJ.

Additionally, this disclosure provides a method of forming a stable coating composition comprising:
a) partially hydrolyzing an aqueous solution of a (glycidyloxyalkyl)trialkoxysilane by heating the silane with a catalytic amount of mineral acid to form a partially hydrolyzed product;
b) removing at least about 95% of volatiles; and
c) mixing the partially hydrolyzed product with i) one or more acrylates, ii) a cationic initiator, and iii) a radical initiator, wherein a stable coating composition is formed;

wherein about 25% to about 49% of the alkoxy groups of the trialkoxysilane moieties have been hydrolyzed to form silanols, and the wherein a change in viscosity of the stable coating composition after 14 days is less than about 10 cps or less than about 6 cps.

The method above can further comprise mixing the partially hydrolyzed product with one or more vinyl ethers, one or more allyl ethers, one or more diglycidyl ethers, one or more triglycidyl ethers, one or more oxetanyl ethers, or a combination thereof.

Furthermore, this disclosure provides a method of forming a mar resistant surface comprising:
a) coating a surface of a substrate with a stable coating composition according to the above method;
b) curing the coated surface at a curing energy of about 0.3 mJ to about 0.8 or about 0.3 mJ to about 0.5 mJ of UV light to form a mar resistant surface; and
c) optionally tinting the mar resistant surface in a heated solution of a dye;

wherein the mar resistant surface has a Bayer abrasion ratio of at least about 1.0.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 1. Flowchart of steps 1-8.

DETAILED DESCRIPTION

The compositions and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the compositions and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The term "alkyl" refers to a branched or unbranched hydrocarbon having, for example, from 1-20 carbon atoms, and often 1-12, 1-10, 1-8, 1-6, or 1-4 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like.

The term "halo" or "halide" refers to fluoro, chloro, bromo, or iodo. Similarly, the term "halogen" refers to fluorine, chlorine, bromine, and iodine.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; and alcohols such as methanol, ethanol, and tert-butanol.

The copolymers disclosed herein can comprise random or block copolymers. The ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl moiety.

The term "stability", as used herein, refers to changes in the disclosed compositions' viscosity. For example, a change in viscosity of the stable coating composition after 14 days is less than about 15 cps.

Embodiments of the Invention

This disclosure provides various embodiments of a copolymer coating prepared from an organosilane of Formula I:

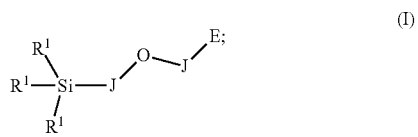

wherein
each $R^1$ is independently OH, —$(C_1$-$C_6)$alkyl, or —O$(C_1$-$C_6)$alkyl;
each J is independently —$(C_1$-$C_6)$alkyl; and
E is an epoxide (e.g., glycidyl);
wherein each —$(C_1$-$C_6)$alkyl and each —O$(C_1$-$C_6)$alkyl is independently linear or branched.

In some embodiments E is ethylene oxide, propylene oxide, epoxy cyclobutyl, epoxy cyclopentyl, or epoxy cyclohexyl. In other embodiments, E is an oxetane. In some additional embodiments, the composition and/or copolymer coating comprises condensation of the silanol groups.

Many epoxy-functional organosilanes are suitable as hydrolysis precursors. Some examples are, but not limited to, glycidoxymethyltrimethoxysilane, glycidoxymethyl-triethoxysilane, glycidoxymethyltripropoxysilane, glycidoxymethyltributoxysilane, b-glycidoxyethyltrimethoxysilane, a-glycidoxyethyl-tripropoxysilane, g-glycidoxypropyl trimethoxysilane, b-glycidoxypropyl trimethoxysilane, d-glycidoxybutyl-triethoxysilane, g-glycidoxybutyl tripropoxysilane, (3,4-epoxycyclohexyl)-methyl-trimethoxysilane, (3,4-epoxycyclohexyl)methyl triethoxysilane, etc.

Additionally, various embodiments of this disclosure provide a copolymer coating comprising monomer units from a) one or more (glycidyloxyalkyl)trialkoxysilanes; b) one or more acrylates; and c) one or more ethers, wherein the one or more ethers is a glycidyl ether, oxetanyl ether, vinyl ether, or a combination thereof; wherein the monomer units a)-c) or a)-b) form a cured copolymer coating and about 25% to about 49% (or to about 45%) of the alkoxy groups of the trialkoxysilane moieties of the copolymer coating have been hydrolyzed to form silanols.

In further embodiments, the copolymer coating has a Bayer abrasion ratio of at least about 1.0, about 2.0, or about 3.0. In other embodiments, the monomer units a)-c) form a cured copolymer coating and the cured copolymer coating is tinted to form a tinted copolymer coating. In some other embodiments, the tinted copolymer coating has a total light transmission of transmission of about 10% to about 90%. In yet other embodiments, the total light transmission is about 1% to about 10%, about 5% to about 15%, about 10% to about 20%, about 1% to about 30%, about 5% to about 25%, about 20% to about 40%, about 18% to about 21%, about 30% to about 50%, less than about 100%, less than about 80%, less than about 60%, less than about 30%, about 30%, or less than about 25%.

In some other embodiments, the copolymer coating has an ASTM D3359 adhesion test value of at least 4 B for a polycarbonate substrate. In yet other embodiments, the adhesion test value is 2 B, 3 B, 5 B, or greater than 4 B. In various additional embodiments, the monomer units a)-c) or a)-b) form the cured copolymer coating at a cure energy of less than about 0.6 mJ, less than about 0.65 mJ, or about 0.1 mJ to about 0.8 mJ.

In yet other embodiments, about 30% to about 40% (or about 30% to about 45%) of the alkoxy groups of the trialkoxysilane moieties of the copolymer coating have been hydrolyzed to form silanols. In yet further embodiments, about 25% to about 32% of the alkoxy groups of the trialkoxysilane moieties of the copolymer coating have been hydrolyzed to form silanols. In other embodiments, about 5% to about 30%, about 25% to about 35%, or about 20% to about 80% of the alkoxy groups of the trialkoxysilane moieties of the copolymer coating have been hydrolyzed to form silanols.

In additional embodiments, one, two or three of the one or more acrylates is a tri acrylate, diacrylate, monoacrylate, or a combination thereof. In some embodiments, the acrylate comprises one, two, three, four, or more than four acryloyl groups. In yet other embodiments, one of the one or more acrylates is a diacrylate. In some embodiments, the diacrylate is hexanediol diacrylate. In yet further embodiments, one other acrylate of the one or more acrylates has three or more acryloyl groups. In other embodiments, the one other acrylate is tris[2-(acryloyloxy)ethyl] isocyanurate.

In various other embodiments, the one or more ethers is a glycidyl ether, and the glycidyl ether is cyclohexanedimethanol diglycidyl ether, trimethylolpropane triglycidyl ether, or a combination thereof. In yet other embodiments, the one or more ethers is an oxetanyl ether, and the oxetanyl ether is a xylene dioxetane (XDO), a dioxetanyl ether (DOX), or a combination thereof.

In other embodiments, the glycidyloxyalkyl(trialkoxy) silane monomer units comprise at least about 10 wt % of the copolymer coating, and optionally the glycidyloxyalkyl(trialkoxy) silane is 3-glycidyloxypropyl(trimethoxy)silane. In additional embodiments, the silane monomer units comprise about 10 wt % to about 80 wt % (or about 20 wt % to about 60 wt %) of the copolymer coating.

In various additional embodiments, this disclosure provides a method of forming a stable coating composition comprising:
  a) partially hydrolyzing an aqueous solution of a (glycidyloxyalkyl)trialkoxysilane by heating the silane with a catalytic amount of mineral acid to form a partially hydrolyzed product;
  b) removing at least about 95% of volatiles; and
  c) mixing the partially hydrolyzed product with i) one or more acrylates, ii) a cationic initiator, and iii) a radical initiator, wherein a stable coating composition is formed;
wherein about 25% to about 49% of the alkoxy groups of the trialkoxysilane moieties have been hydrolyzed to form silanols, and the wherein a change in viscosity of the stable coating composition after 14 days is less than about 10 cps or less than about 6 cps.

In some embodiments, the change in viscosity of the stable coating composition after 14 days is about 1 cps to about 10 cps. In other embodiments, the stable coating composition is in contact with the atmosphere. In yet other embodiments, the stable coating composition is shielded from exposure to electromagnetic radiation, or light. In further embodiments, the change in viscosity of the stable coating composition after 14 days is less than about 1 cps to about 10 cps, wherein the stable coating composition is in contact with the atmosphere and shielded from exposure to light.

In other embodiments, the stable coating composition (or mixture formed in the method above) further comprises a vinyl ether, an allyl ether, a trialkylsilane glycidyl ether, a bis-glycidoxy tetraalkyldisiloxane, a non-hydrolysable silane glycidyl ether, a non-silane glycidyl ether, a monoglycidyl ether or a combination thereof. In yet other embodiments, the above method further comprising mixing the partially hydrolyzed product with one or more vinyl ethers, one or more allyl ethers, one or more diglycidyl ethers, one or more triglycidyl ethers, one or more oxetanyl ethers, or a combination thereof.

In other embodiments, one of the one or more diglycidyl ethers is cyclohexanedimethanol diglycidyl ether. In yet other embodiments, one of the one or more triglycidyl ethers is trimethylolpropane triglycidyl ether. In further embodiments, one of the one or more oxetanyl ethers is a xylene dioxetane (XDO), one other of the one or more oxetanyl ethers is a dioxetanyl ether (DOX), or a combination thereof. In some other embodiments, one of the one of more acrylates is hexanediol diacrylate, one other of the one or more acrylates is tris[2-(acryloyloxy)ethyl] isocyanurate. In some aspects of the disclosure, one of the one or more diglycidyl ethers is cyclohexanedimethanol diglycidyl ether, one of the one or more triglycidyl ethers is trimethylolpropane triglycidyl ether, or a combination thereof. In other embodiments, the one or more oxetanyl ethers is a xylene dioxetane (XDO), a dioxetanyl ether (DOX), or a combination thereof.

In yet other embodiments, the partially hydrolyzed product is mixed with an epoxide, such as tris(2,3-epoxypropyl) isocyanurate, pentaerythritol tetraglycidyl ether, sorbitol glycidyl ether, polyglycerol glycidyl ether, other higher order glycidyl ether, such as those having more than three glycidyl ether groups, or a combination thereof.

In various embodiments, the glycidyloxyalkyl(trialkoxy) silane is 3-glycidyloxypropyl(trimethoxy)silane, 2-glycidyloxypropyl(trimethoxy)silane, or 1-glycidyloxypropyl (trimethoxy)silane. In some other embodiments, one of the one of more acrylates is hexanediol diacrylate, or tris[2-(acryloyloxy)ethyl] isocyanurate. In other embodiments, one of the one of more acrylates is ditrimethylolpropane tetracrylate, pentaerythritol tetracrylate, dipentaerythritol hexacrylate, or a combination thereof.

In yet other embodiments, the partially hydrolyzed product comprises about 50 wt % to about 75 wt % of the stable coating composition, or about 55 wt %, about 60 wt %, about 65 wt %, or about 70 wt % of the stable coating composition.

In further embodiments, the stable coating composition comprises a surface additive, or other additives known in the art, such as silicon surface additive, etc. In additional embodiments, the partially hydrolyzed product forms a siloxane oligomer, or a siloxane polymer.

This disclosure also provides various embodiments of a method of forming a mar resistant surface according to the method of forming a stable coating composition described herein, comprising:
  a) coating a surface of a substrate with a stable coating composition according to the methods described herein;
  b) curing the coated surface at a curing energy of about 0.3 mJ to about 0.8 or about 0.3 mJ to about 0.5 mJ of UV light to form a mar resistant surface; and
  c) optionally tinting the mar resistant surface in a heated solution of a dye;
wherein the mar resistant surface has a Bayer abrasion ratio of at least about 1.0.

In various embodiments, curing is at an energy (e.g., the cure energy) of less than about 1 mJ, less than about 0.8 mJ, less than about 0.7 mJ, less than about 0.6 mJ, less than about 0.5 mJ, less than about 0.4 mJ, less than about 0.3 mJ, less than about 0.2 mJ, less than about 0.1 mJ, less than about 0.05 mJ, or about 0.05 mJ to about 0.5 mJ. In some embodiments, the energy of curing is provided by a UV source, other sources of radiation, or alternate forms of energy that can cure the disclosed composition for providing mar resistant coatings and tintable mar resistant coatings.

In additional embodiments, the substrate is a polycarbonate substrate. In some further embodiments, the mar resistant surface has a coating thickness of about 3 microns to about 6 microns. The coating thickness can also be about 1 micron to about 10 microns in other embodiments. In yet other embodiments, the mar resistant surface has a boiling water resistance value of about 5B, or 4B, or less than 4B.

In some embodiments the Bayer abrasion ratio is about 1 to about 10, about 0.5 to about 5, about 2 to about 8, or about 3 to about 6. In further embodiments, the mar resistant surface has a boiling water resistance value of at least 3 B, wherein the surface is a surface of a polycarbonate substrate.

In some additional embodiments, the disclosed methods further comprise tinting the mar resistant surface in a heated solution of a dye. In other embodiments, the dye is a BPI black dye. In yet other embodiments, the heated dye solution is at about 40° C. to about 120° C., or about 80° C. to about 100° C.

In further embodiments the curing energy corresponds the energy measured by a radiometer (dosimeter) capable of measuring ultraviolet energies at about 230 nm to about 410 nm. In yet other embodiments, the radiometer is a VersaProbe™ Pro CON-TROL-CURE® IL 1400 having a probe capable of measuring ultraviolet energies at about 230 nm to about 410 nm.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2, 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

Results and Discussion

Curing of the disclosed coating compositions is preferably photo-activated by free-radical initiators, although, thermally activated free radical initiators may also be used. Some examples of useful photoinitiators for this purpose are the halo alkylated aromatic ketones, chloromethylbenzophenones, certain benzoin ethers, certain acetophenone derivatives such as diethoxyacetophenone and 2-hydroxy-2-methyl-1-phenylpropan-1-one, etc.

Useful cationic initiators for the purposes of this disclosure include, but are not limited to, the aromatic onium salts, including salts of Group Va elements, such as phosphonium salts, e.g., triphenylphenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts, e.g., diphenyliodonium chloride.

The polymerizable ether component in the composition imparts tintability of the coating. Some examples are, but not limited to, glycidyl ethers, allyl ethers and vinyl ethers. The polymerizable ethers may be monofunctional or polyfunctional, preferably polyfunctional, and desirably are cationically polymerizable. Mixtures of the polymerizable ethers may be used, particularly mixtures of glycidyl ethers and vinyl ethers. The polymerizable ether ingredient may consist of a mixture of two or more ethers, the relative amounts of which are chosen so as to provide the cured coating with good tintability while maintaining acceptable adhesion to substrates.

Of the ethylenically unsaturated monomers present in the coating composition, vinyl acetate contributes to good adhesion to polycarbonate substrates. However, acrylic-functional monomers and oligomers are preferred. Useful acrylic compounds for improving adhesion to polycarbonate substrates include both mono, di-functional and tri-functional monomers, but other or additional polyfunctional acrylic monomers may also be included. Examples of monofunctional acrylic monomers include, but are not limited to, acrylic and methacrylic esters such as ethyl acrylate, butyl acrylate, etc.

A comparison for abrasion resistance and tintability is shown in Table 1A for tintable coatings by Coburn Optical (U.S. Pat. No. 7,732,006), sold as UV Max, and by Ultra Optics (U.S. Pat. No. 6,100,313), sold as UV NV. Thus, this disclosure provides a coating composition for a copolymer coating that has properties improved over the tintable coatings shown in Table 1A.

TABLE 1A

Comparison of coating properties

| Properties | Supplier | |
| --- | --- | --- |
| | Colburn Optical UV Max | Ultra Optics UV NV |
| Bayer Ratio | 1.0 | 1.8 |
| % Transmission* | 15 | 18 |

*% Transmission after 15 mins in BPI Black (Brain Power Inc) at 95-100° C. Note that the Bayer abrasion ratio reported in U.S. Pat. No. 7,732,006 deviated from the standard by the use of an uncoated polycarbonate lens as a comparison.

The silicon-based oligomers described herein are prepared using water needed to hydrolyze less than 50% of the alkoxy groups present in the alkoxy epoxy silanes and preferably less than 40% and most preferably 10-40%. Accordingly, the disclosed compositions will lead to copolymers of lower molecular weight, lower viscosities, and having properties that are described in the Examples below.

These oligomers in combination with acrylic monomers and catatonically curable monomers or oligomers, and absent the tintability enhancing compounds of U.S. Pat. No. 7,732,006 give tintable coatings having a much superior combination of tintability and abrasion resistance while curing with lower energy. The oligomers can be used separately or in combination with other oligomers having a different amount of hydrolysis.

The improved abrasion resistance may be due to a higher cross-linking density as a result of the improved diffusion of lower molecular weight polymers during the curing process.

Description of Tests

Bayer Abrasion Test:

The Bayer abrasion test is an often cited test method for abrasion resistance. The abrasion tests were performed on both a coated and an uncoated CR-39 standard lens. Abrasion occurs from oscillating particles of alumina zirconia (e.g., a sand). After a set number of cycles, the level of haze produced was measured on both lenses. The ratio of haze level of the uncoated lens to the coated lens is the Bayer Ratio. A Bayer Ratio of "1" means that the coating has equivalent abrasion resistance to an uncoated CR-39 standard. A Bayer Ratio of "5" means that the uncoated CR-39 standard had five times the haze level as the coated lens. The reported results are the average of 3 tested lenses.

Adhesion Test:

A coated lens was scored by cross hatching according to the ASTM D3359 protocol (the ASTM D3359 protocol is incorporated herein by reference). Then the lens was immersed in boiling deionized water for 15 minutes and allowed to cool to room temperature. Adhesion was measured by the ability of 600 tape from 3M to peel off a diamond shaped segment of the hatched coating.

Tinting Test:

Lenses were coated with the disclosed compositions, cured according to the disclosed conditions, and allowed to sit for 15 mins after curing. Next, the coated lens was immersed in a solution of a dye bath at 95-100° C. The dye bath was prepared from a BPI black dye that was diluted according to the manufacturer's directions. After 15 mins the lenses were removed from the dye bath, washed with deionized water and dried. Transmittance of the dyed lens was measured using a BYK Hazeguard spectrophotometer. The results were reported as percent transmission. A lower transmission percentage indicates better tintability of the dyed lens.

There are different conventions for describing tints. Table 1B shows the generally accepted standard parameters used for brown or grey colored tints. This disclosure provides mar resistant coatings that can be cured at UV energy levels (less than 0.6 mJ) that are lower than required of other compositions. Also, the disclosed coatings can be tinted to very dark shades (grade 5 or less).

TABLE 1B

Grades of tinted coatings

| Grade | | % Absorption | % Transmission* | Shade |
|---|---|---|---|---|
| 1 | A | 20 | 80 | Pale |
| 2 | B | 30 | 70 | Light |
| 3 | C | 50 | 50 | Medium |
| 4 | D | 75 | 25 | Dark |
| 5 | E | >80 | <20 | Very Dark |

*Also referred to as the Light Transmission Factor (LTF).

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Preparation of Mar Resistant Coatings

The hydrolyzed epoxy silane is prepared by adding 3-glycidoxypropyltrimethoxysilane, deionized water and concentrated HCL in the amounts according to Table 2 in a round bottom flask and immersing the flask in a water bath at room temperature. The flask rotated to agitate the mixture. The mixture is heated to 60-65° C. and held for one hour. While the temperature is held at 60-65° C., a slight vacuum is applied carefully to prevent boil over until 90-99% of the theoretical mass of volatiles are removed. The volatiles are primarily methyl alcohol. The low viscosity oligomer is then cooled to room temperature.

TABLE 2

Composition of silane oligomers 1-4 based on % of hydrolyzed methoxy groups

| Reagents and Silane Products* | Wt. (gm) | Moles | Total hydrolyzed methoxy (%) |
|---|---|---|---|
| 3-Glycidoxypropyltrimethoxysilane | 472.0 | 2.0 | |
| Deionized water | 42.0 | 2.33 | |
| Conc. HCl (37%) | 0.25 | 0.0068 | |
| Silane 1 | | | 38.9 |
| 3-Glycidoxypropyltrimethoxysilane | 472.0 | 2.0 | |
| Deionized water | 31.9 | 1.77 | |
| Conc. HCl (37%) | 0.25 | 0.0068 | |
| Silane 2 | | | 29.5 |
| Silane 3 prepared similarly by hydrolysis | | | 36.0 |
| Silane 4 prepared similarly by hydrolysis | | | 40.0 |

*Preparation of Silanes 3 and 4 is similar to the hydrolysis conditions described above for Silanes 1 and 2.

Example 2. Non-Tintable Coating Compositions

Coating compositions 1 and 2 (Table 3) were applied on a polycarbonate lens by spin coating and curing the coated lens at 0.385-0.395 mJ to give a final film thickness of 4.5-5.0 microns. The coatings had an excellent boiling water resistance with a value of 5 B.

TABLE 3

Compositions 1 and 2

| Reagents | Wt. (gm) | Wt. (gm) |
|---|---|---|
| Silane 1 | 60.0 | 0 |
| Silane 2 | 0 | 71.6 |
| Hexanediol diacrylate | 20.0 | 14.3 |
| Tris[2-(acryloyloxy)ethyl] isocyanurate | 15.0 | 9.5 |
| 2-Hydroxy-2-methyl-1-phenyl-propan-1-one | 1.75 | 0.75 |
| Triarlylsulfonium hexafluorine antimonate salt mixture | 3.0 | 3.6 |
| BYK 300 Polyether modified polydimethylsiloxane | 0.25 | 0.25 |
| Composition | 1 | 2 |
| Curing UV Intensity (mJ) | 0.385 | 0.395 |

The coated lenses were compared (Table 4) to the reference sample AST 1 from Ultra Optics, which is the hardest UV curable and solvent free coating in the optical coating market.

TABLE 4

Sample Properties for non-tintable coatings

| | Sample | | |
|---|---|---|---|
| Properties | Composition 1 | Composition 2 | AST 1 |
| Curing UV Intensity (mJ) | 0.385 | 0.395 | 0.6 |
| ASTM D3359 Adhesion* | 5B | 5B | 4-5B |
| Bayer Abrasion Ratio | 2.76 | 2.55 | 2.8 |
| Initial Viscosity (cps) | 16.0 | 10.0 | 17.0 |
| 14-day Viscosity (cps) | 19.25 | 15.0 | 32.0 |

*Adhesion to a polycarbonate substrate.

Compositions 1 and 2 shown in Table 4 have similar adhesion and abrasion properties to the reference coating, AST 1. However, both compositions have better long-term stability as determined by the smaller difference in viscosity after 14 days. An increase in the viscosity of mar resistant compositions can result from, for example, exposure of the composition to atmospheric moisture and/or light.

Example 3. Tintable Coating Compositions

Coating compositions 3, 4 and 5 (Table 5) were applied on a polycarbonate lens by spin coating and curing the coated lens at 0.385-0.395 mJ to give a final film thickness of 4.5-5.0 microns.

TABLE 5

Compositions 3, 4 and 5

| Reagents | Wt. (gm) | Wt. (gm) | Wt. (gm) |
|---|---|---|---|
| Silane 1 | 53.6 | 53.6 | 0 |
| Silane 3 | 0 | 0 | 14.0 |
| Silane 4 | 0 | 0 | 40.0 |
| Hexanediol diacrylate | 24.8 | 24.8 | 24.9 |
| Trimethylolpropane triglycidyl ether | 15.94 | 0 | 8.0 |
| Xylene oxetane (XDO) | 0 | 7.8 | 0 |
| Dioxetanyl ether (DOX) | 0 | 7.7 | 0 |
| Cyclohexanedimethanol diglycidyl ether | 0 | 0 | 8.0 |
| 2-Hydroxy-2-methyl-1-phenyl-propan-1-one | 1.24 | 1.24 | 1.25 |
| Triarlylsulfonium hexafluorine antimonate salt mixture | 4.17 | 4.17 | 3.6 |
| BYK 300 Polyether modified polydimethylsiloxane | 0.25 | 0.25 | 0.25 |
| Composition | 3 | 4 | 5 |
| Curing UV Intensity (mJ) | 0.385 | 0.385 | 0.395 |

The coated lenses were compared (Table 6) to two reference samples from Ultra Optics. One tintable coating is referred to as UV87, and the other is UV NV. The latter coating is the bestselling solvent free tintable coating on the market.

TABLE 6

Sample properties for tintable coatings

| Properties | Composition 3 | Composition 4 | Composition 5 | UV87 | UVNV |
|---|---|---|---|---|---|
| Curing UV Intensity (mJ) | 0.385 | 0.385 | 0.395 | 0.6 | 0.6 |
| ASTM D3359 Adhesion* | 5B | 5B | 5B | 4-5B | 5B |
| Bayer Abrasion Ratio | 2.45 | 2.0 | 2.2 | 1.8 | 1.8 |
| % Transmission | 20.5 | 18.6 | 19.5 | 18.5 | 18.0 |
| Initial Viscosity (cps) | 16.0 | — | 11.5 | 28.0 | — |
| 14-day Viscosity (cps) | 19.25 | — | 13.0 | 34.3 | — |

*Adhesion to a polycarbonate substrate.

Compositions 3, 4 and 5 shown in Table 6 have similar adhesion and abrasion properties to the reference coatings from Ultra Optics. However, all three compositions have better Bayer abrasion ratios and better tintability as determined by the lower % transmission of light. In addition, the long-term stability of the compositions is better, as determined by the smaller difference in viscosity after 14 days.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A copolymer coating comprising a copolymer comprising monomer units from:
    a) 3-glycidyloxypropyltrimethoxysilane having a weight percent of 53.6 to 71.6 based on the total weight of the copolymer coating, wherein 30% to 40% of the methoxy groups of the trimethoxysilane moieties of 3-glycidyloxypropyltrimethoxysilane in the copolymer coating have been hydrolyzed to form silanols; and
    b) hexanediol diacrylate having a weight percent of 14.3 to 24.9 based on the total weight of the copolymer coating;
    wherein the copolymer coating was cured with a curing energy of 0.1 mJ to 0.5 mJ.

2. The copolymer coating of claim 1 wherein the copolymer coating has a Bayer abrasion ratio of at least 2.0.

3. The copolymer coating of claim 2 wherein the cured copolymer coating has an ASTM D3359 adhesion test value of at least 4 B for a polycarbonate substrate.

4. The copolymer coating of claim 2 wherein the copolymer coating was cured with a curing energy of 0.3 mJ to 0.5 mJ.

5. The copolymer coating of claim 4 wherein the copolymer coating was cured with a curing energy of 0.3 mJ to 0.4 mJ.

6. The copolymer coating of claim 1 wherein the copolymer coating is a tinted copolymer coating.

7. The copolymer coating of claim 6 wherein the tinted copolymer coating has a total light transmission of 10% to 90%.

8. The copolymer coating of claim 6 wherein the copolymer further comprises copolymerized monomer units from one or more ethers.

9. The copolymer coating of claim 8 wherein the one or more ethers is cyclohexanedimethanol diglycidyl ether, trimethylolpropane triglycidyl ether, xylene dioxetane (XDO), dioxetanyl ether (DOX), or a combination thereof.

10. The copolymer coating of claim 9 wherein the one or more ethers is dioxetanyl ether (DOX).

11. The copolymer coating of claim 1 wherein the copolymer further comprises copolymerized monomer units from one other acrylate wherein the one other acrylate has three or more acryloyl groups.

12. The copolymer coating of claim 11 wherein the one other acrylate is tris[2-(acryloyloxy)ethyl] isocyanurate.

13. A method for forming the copolymer coating according to claim 1, comprising:
    a) partially hydrolyzing an aqueous solution of 3-glycidyloxypropyltrimethoxysilane by heating the 3-glycidyloxypropyltrimethoxysilane with a catalytic amount of mineral acid to form a partially hydrolyzed product;
    b) removing at least about 95% of volatiles; and
    c) mixing the partially hydrolyzed product with i) hexanediol diacrylate, ii) a cationic initiator, and iii) a radical initiator, wherein a stable coating composition is thereby formed; wherein a change in viscosity of the stable coating composition after 14 days is less than about 10 cps;

d) coating a surface of a substrate with the stable coating composition;
e) curing the coated surface with a curing energy of 0.1 mJ to 0.5 mJ of UV light to form the copolymer coating; and
e) optionally tinting the copolymer coating in a heated solution of a dye;
wherein 3-glycidyloxypropyltrimethoxysilane has a weight percent of 53.6 to 71.6 based on the total weight of the copolymer coating and 30% to 40% of the methoxy groups of the trimethoxysilane moieties of 3-glycidyloxypropyltrimethoxysilane in the copolymer coating have been hydrolyzed to form silanols; and
hexanediol diacrylate has a weight percent of 14.3 to 24.9 based on the total weight of the copolymer coating;
wherein the copolymer coating forms a mar resistant surface on the substrate and the mar resistant surface has a Bayer abrasion ratio of at least about 1.0.

14. The method of claim 13 comprising tinting the copolymer coating wherein the copolymer further comprises copolymerized monomer units from one or more vinyl ethers, one or more allyl ethers, one or more diglycidyl ethers, one or more triglycidyl ethers, one or more oxetanyl ethers, or a combination thereof.

15. The method of claim 14 wherein one of the one or more diglycidyl ethers is cyclohexanedimethanol diglycidyl ether;
one of the one or more triglycidyl ethers is trimethylolpropane triglycidyl ether;
one of the one or more oxetanyl ethers is a xylene dioxetane (XDO), dioxetanyl ether (DOX), or a combination thereof.

16. The method of claim 13 further comprising mixing the partially hydrolyzed product with tris[2-(acryloyloxy)ethyl] isocyanurate.

17. The method of claim 13 wherein the stable coating composition further comprises a surface additive.

18. The method of claim 13 wherein the substrate is polycarbonate, the mar resistant surface has a coating thickness of about 3 microns to about 6 microns, and/or the mar resistant surface has a boiling water resistance value of about 5 B.

19. The method of claim 13 further comprising mixing the partially hydrolyzed product with a polyether modified polydimethylsiloxane, and the cationic initiator is triphenylsulfonium hexafluoroantimonate, and the radical initiator is 2-hydroxy-2-methy-1-phenylpropan-1-one.

20. The method of claim 13 wherein the curing energy is 0.3 mJ to 0.5 mJ.

21. The method of claim 13 wherein the curing energy is 0.3 mJ to 0.4 mJ.

* * * * *